United States Patent Office 3,396,554
Patented Aug. 13, 1968

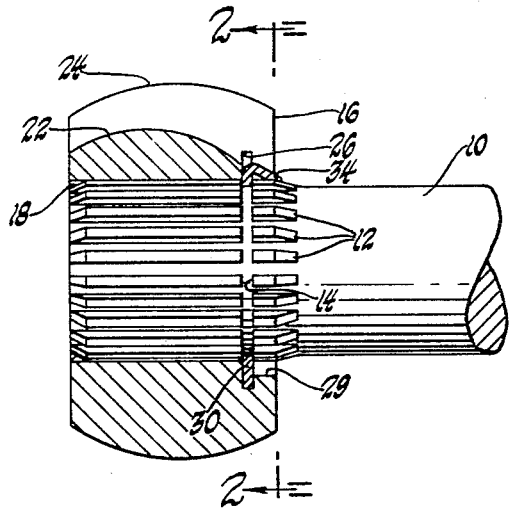
Fig. 1
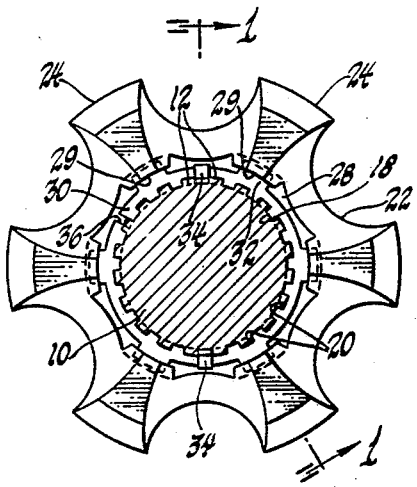
Fig. 2
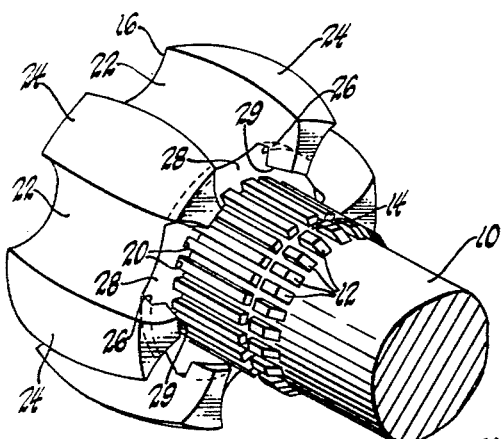
Fig. 3
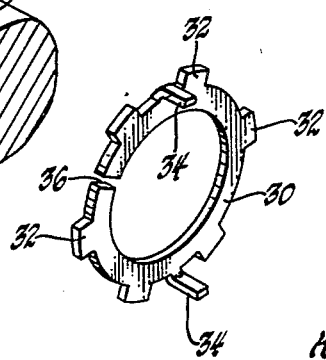
INVENTOR.
Kenneth L. Westercamp
BY
Herbert Furman
ATTORNEY

3,396,554
RETAINING RING FOR A UNIVERSAL
JOINT MEMBER
Kenneth L. Westercamp, Saginaw, Mich., assignor to
General Motors Corporation, Detroit, Mich., a corporation of Delaware
Filed Apr. 14, 1966, Ser. No. 542,615
5 Claims. (Cl. 64—7)

ABSTRACT OF THE DISCLOSURE

A universal joint inner race has a splined bore for receiving a splined shaft. The shaft includes an annular groove which receives a portion of a split retaining ring. The retaining ring includes a plurality of radial projections which are insertable into axially relieved slots formed in the inner race and are rotatable into a plurality of adjacent internal groove segments formed in the inner race to axially lock the inner race to the shaft. A locking tab on the ring is deformable into engagement with the splines to lock the ring against rotation.

---

This invention relates generally to retaining rings and more specifically to a split retaining ring for axially securing a member to a shaft.

One feature of this invention is that the member includes a plurality of circumferentially spaced annular groove segments which mate with an annular shaft groove to confine the retaining ring. Another feature is that the retaining ring is bayonet mounted to axially secure the member to the shaft. Yet another feature is that radial projections formed on the retaining ring are received within axially relieved slots formed adjacent each groove segment and are then rotated into the groove segments to axially lock the member to the shaft. Still another feature is that the retaining ring includes a pair of tabs that are deformable into contact with the shaft to lock the retaining ring against rotation.

Further features of this invention will become readily apparent upon reference to the following detailed description of the attached drawings in which:

FIGURE 1 is a plan view of a shaft coupling employing a retaining ring according to this invention and partially sectioned along the plane generally indicated by line 1—1 of FIGURE 2;

FIGURE 2 is a sectional view taken generally on the plane indicated by line 2—2 of FIGURE 1; and FIGURE 3 is an exploded perspective view.

Referring now to FIGURES 1 and 3, a rotary shaft 10 includes a plurality of ramped splines 12 at one end. An annular groove 14 is formed in the splines adjacent their inner ends. A universal joint inner race or member 16 has a central bore 18 that includes a plurality of internal axial grooves 20. As best shown in FIGURES 2 and 3, member 16 includes a plurality of circumferentially spaced ball races 22 separated by axial ribs 24. An annular groove is formed adjacent one end of member 16 and comprises groove segments 26 in ribs 24 and slots 28 adjacent the ends of races 22. Slots 28 are both axially and radially relieved. Ribs 24 are additionally undercut at 29.

As shown in FIGURE 3, a split retaining ring 30 is provided with a plurality of radial projections 32 and a pair of axially extending tabs 34. The ring is split at 36 to provide radial resiliency. As shown in FIGURES 1 and 2, the inner edge of ring 30 is received in groove 14, while projections 32 are received within groove segments 26, thus axially locking member 16 to shaft 10. Tabs 34 are bent into engagement with shaft 10 between splines 12 to nonrotatably fix the ring to the shaft.

One mode of assembly is to first mount 30 on shaft 10 and force it axially up the ramped ends onto splines 12 and into groove 14. Shaft 10 is next inserted within bore 18 with splines 12 received in grooves 20. Ring 30 is then oriented with projections 32 axially aligned with slots 28. Member 16 is slid axially on shaft 10 until projections 32 abut the ends of slots 28. Ring 30 is rotated until projections 32 enter groove segments 26, whereupon tabs 34 are bent into engagement with shaft 10 between splines 12. Since both the member and the ring are nonrotatably fixed to shaft 10, projections 32 axially fix member 16 to shaft 10.

Another mode of assembly would be to first mount member 16 on shaft 10 with groove segments 26 in radial registry with groove 14. Ring 30 would then be snapped into groove 14 and rotated into locking position. The undercut portions 29 of ribs 24 permit ring 30 to clear ribs 24 during this mode of assembly. However, it is readily apparent that if the radial thickness of ring 30 were equivalent to the depth of groove 14, the undercuts 29 would not be necessary for the first described mode of assembly.

Ring 30 is particularly useful with a universal joint inner member, as illustrated, since races 22 enable a single cutting operation to form slots 28, undercuts 29 and groove segments 26. However, this invention is applicable to any shaft mounted member and may utilize any number of ring projections and corresponding groove segments and slots. If splines are not provided adjacent the ring, tabs 34 may be bent into frictional engagement with shaft 10 to nonrotatably secure the ring thereto. Thus a retaining ring is bayonet mounted to secure a member to a shaft.

While only a preferred embodiment is shown and described, other modifications are contemplated within the scope of this invention.

I claim:
1. Retaining means for retaining and axially locating a female member on a shaft comprising at least one internal groove segment formed in the member, an axially relieved slot formed in the member adjacent the groove segment, annular groove means formed in the shaft externally thereof, an annular retaining ring having a portion received within the shaft groove means and including at least one external radial projection receivable within the slot and rotatable into the member groove segment to axially secure the member to the shaft, and means to lock the retaining ring against rotation.

2. The retaining means recited in claim 1, wherein the member has a plurality of circumferentially spaced internal groove segments and a plurality of axially relieved slots formed therein, each slot being adjacent one of the groove segments, and the retaining ring includes a plurality of circumferentially spaced external radial projections each receivable within one of the slots and rotatable into one of the groove segments.

3. The retaining means recited in claim 1, wherein the securing means includes at least one tab on the retaining ring deformable into engagement with the shaft.

4. The retaining means recited in claim 2, wherein the shaft includes a plurality of splines and the member has a plurality of mating splines for locking the member to the shaft against rotation, and the securing means include a tab on the retaining ring deformable into a position between the shaft splines to rotatably secure the retaining ring to the shaft.

5. The retaining means recited in claim 2, wherein the member is a universal joint inner member having circumferentially spaced ball races separated by axial ribs, the slots being formed adjacent each race end and the groove segments being formed adjacent the end of each rib.

References Cited

UNITED STATES PATENTS

| | | | |
|---|---|---|---|
| 2,525,695 | 10/1950 | Lombard | 64—9 |
| 2,712,740 | 7/1955 | Boyd | 64—9 |
| 2,729,479 | 1/1956 | Leister | 308—236 X |
| 2,861,850 | 11/1958 | Nyblom | 308—236 |
| 2,886,355 | 5/1959 | Wurzel | 308—236 X |
| 2,926,033 | 2/1960 | Zarrillo | 287—52.05 |
| 2,987,897 | 6/1961 | Spence | 64—21 |

HALL C. COE, *Primary Examiner.*